(12) United States Patent
Parkhe

(10) Patent No.: US 9,969,022 B2
(45) Date of Patent: May 15, 2018

(54) VACUUM PROCESS CHAMBER COMPONENT AND METHODS OF MAKING

(75) Inventor: Vijay D. Parkhe, San Jose, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 1133 days.

(21) Appl. No.: 12/892,219

(22) Filed: Sep. 28, 2010

(65) Prior Publication Data

US 2012/0076574 A1    Mar. 29, 2012

(51) Int. Cl.
| | |
|---|---|
| *B23K 1/00* | (2006.01) |
| *B23K 1/19* | (2006.01) |
| *B23K 101/20* | (2006.01) |
| *B23K 103/18* | (2006.01) |
| *F16B 5/08* | (2006.01) |
| *B23K 103/10* | (2006.01) |
| *B23K 103/12* | (2006.01) |
| *B23K 103/00* | (2006.01) |
| *B23K 103/04* | (2006.01) |

(52) U.S. Cl.
CPC ............ *B23K 1/0008* (2013.01); *B23K 1/19* (2013.01); *B23K 2201/20* (2013.01); *B23K 2203/05* (2015.10); *B23K 2203/10* (2013.01); *B23K 2203/12* (2013.01); *B23K 2203/18* (2013.01); *B23K 2203/52* (2015.10); *F16B 5/08* (2013.01); *Y10T 403/479* (2015.01)

(58) Field of Classification Search
USPC .................................. 277/630, 637; 361/234
See application file for complete search history.

(56) References Cited

U.S. PATENT DOCUMENTS

| | | | |
|---|---|---|---|
| 5,477,009 A * | 12/1995 | Brendecke et al. .......... 174/539 |
| 6,534,194 B2 | 3/2003 | Weihs et al. | |
| 6,538,872 B1 | 3/2003 | Wang et al. | |
| 6,736,942 B2 | 5/2004 | Weihs et al. | |
| 6,853,533 B2 * | 2/2005 | Parkhe ..................... 361/234 |
| 6,991,856 B2 | 1/2006 | Weihs et al. | |
| 7,121,402 B2 | 10/2006 | Van Heerden et al. | |
| 7,265,962 B2 | 9/2007 | Miyaji et al. | |
| 7,292,439 B2 | 11/2007 | Wilson et al. | |
| 7,403,386 B2 | 7/2008 | Aihara et al. | |

(Continued)

FOREIGN PATENT DOCUMENTS

| | | |
|---|---|---|
| JP | 09-045757 | 4/1997 |
| JP | H10-32239 | 2/1998 |

(Continued)

OTHER PUBLICATIONS

Caswell, Greg, "NanoBond Assembly—A Rapid, Room Temperature Soldering Process", *First Published by the IMAPS European Microelectronics & Packaging Conference (EMPC)* 2009, 6 pgs.

(Continued)

*Primary Examiner* — Vishal A Patel
(74) *Attorney, Agent, or Firm* — Servilla Whitney LLC

(57) ABSTRACT

A vacuum process chamber component comprising two separate pieces with an o-ring between the pieces and solder bonded together is described. The component may be an electrostatic chuck comprising a ceramic electrostatic puck and a metal baseplate with at least one o-ring therebetween and joined by a solder bond is described. Methods of making and using vacuum process chamber component are also described.

22 Claims, 3 Drawing Sheets

(56) References Cited

U.S. PATENT DOCUMENTS

| | | |
|---|---|---|
| 7,589,950 B2 | 9/2009 | Parkhe et al. |
| 2001/0011637 A1 | 8/2001 | Wytman |
| 2002/0050246 A1* | 5/2002 | Parkhe .................. 118/500 |
| 2002/0075624 A1 | 6/2002 | Wang et al. |
| 2006/0002053 A1 | 1/2006 | Brown et al. |
| 2006/0032193 A1 | 2/2006 | Heerden et al. |
| 2008/0089001 A1* | 4/2008 | Parkhe et al. ........... 361/234 |
| 2009/0186195 A1 | 7/2009 | Spraker et al. |
| 2009/0201622 A1 | 8/2009 | Brown et al. |
| 2010/0039747 A1* | 2/2010 | Sansoni et al. .......... 361/234 |
| 2010/0156054 A1 | 6/2010 | Sun et al. |
| 2012/0002345 A1 | 1/2012 | Kafuku et al. |

FOREIGN PATENT DOCUMENTS

| | | |
|---|---|---|
| JP | 10270540 | 10/1998 |
| JP | 11163109 | 6/1999 |
| JP | 11176919 | 7/1999 |
| JP | 2001-210705 | 8/2001 |
| JP | 2004-311522 | 11/2004 |
| JP | 2006-009012 | 8/2006 |
| JP | 2006-522722 | 10/2006 |
| JP | 2009-094137 | 4/2009 |
| JP | 2010-199107 | 9/2010 |
| WO | WO-2008048518 | 4/2008 |

OTHER PUBLICATIONS

"International Search Report and Written Opinion in PCT/US2011/053426", dated May 3, 2012, 12 pages.

* cited by examiner

VACUUM PROCESS CHAMBER COMPONENT AND METHODS OF MAKING

BACKGROUND

Embodiments of the present invention relate to vacuum process chamber components, for example, an electrostatic chuck for holding a substrate in a process chamber, and related methods of manufacture.

In the processing of substrates, such as semiconductor wafers and displays, the substrate is placed on a support in a vacuum process chamber and suitable processing conditions are maintained in the chamber. During processing, a process gas is introduced into the chamber and the chamber is typically maintained at low pressure or under vacuum conditions.

Components used in vacuum process chambers may be made from two different parts that are assembled together, either mechanically or by bonding the parts together. For example, an electrostatic chuck may comprise a composite baseplate and an electrostatic puck, which may both be made of similar materials such as metal or ceramics. In some instances, the baseplate may be made from metal and the electrostatic puck may be made from a ceramic material. Electrostatic chucks can be detachable and easily removed from a support pedestal for cleaning or replacement. The baseplate also has a good thermal conductivity to provide efficient removal of heat generated during processes which use plasma. It is generally difficult to join two parts made from dissimilar materials with an o-ring between the parts to form a hermetic seal. In situations where the materials have different coefficients of thermal expansion, conventional soldering and brazing techniques are undesirable because the coefficients of thermal expansion of the puck and baseplate are different. In conventional soldering processes, a large amount of the components adjacent the solder is heated and upon contraction small crack and stresses are formed. These stresses often occur when ceramic plates are bonded to metal plates. Therefore, there is a need in the art for bonding two parts together with an o-ring between the parts, for example, electrostatic chucks, that provide a good gas tight seal between the parts.

SUMMARY

One or more embodiments of the invention are directed to components for use a in a vacuum process chamber. The components comprise a first piece, a second piece and at least one o-ring compressed between the first piece and the second piece. The at least one o-ring defines an outer radial portion and an inner radial portion of the component. A solder bond joins the first piece to the second piece to provide a hermetic seal between the first piece and second piece such that when one of the outer portion and inner portion is under vacuum pressure and the other of the outer portion and inner is under atmospheric pressure, the hermetic seal prevents a leak between the outer portion and the inner portion. In detailed embodiments, the solder bond is formed using an electrically ignited foil material.

Additional embodiments are directed to a component comprising at least one o-ring between a first piece and a second piece. The component is press fitted to compress the at least one o-ring and interbonded by a solder bond providing a hermetic seal therebetween. In detailed embodiments, the at least one o-ring defines an outer portion and an inner portion of the component and the solder bond providing a hermetic seal between the first piece and second piece such that when one of the outer portion and inner portion is under vacuum pressure and the other of the outer portion and inner is under atmospheric pressure, the hermetic seal prevents a leak between the outer portion and the inner portion.

The first piece and the second piece can be made of various materials. In detailed embodiments, both the first piece and the second piece are metal. In some embodiments, one of the first piece and the second piece is metal and the other of the first piece and the second piece is ceramic.

In one or more embodiments, the at least one o-ring is positioned within a groove in one or more of the first piece and the second piece. In detailed embodiments, the at least one o-ring is compressible. In specific embodiments, the at least one o-ring is made of a perfluoropolymer. In some embodiments, the at least one o-ring is made from a soft metal. In some embodiments, the at least one o-ring in a compressed state has a thickness about 75% of the thickness when in an uncompressed thickness.

In some embodiments, the first piece is an electrostatic puck comprising a ceramic body and the second piece is a baseplate comprising a metal body. In detailed embodiments, the apparatus further comprises at least one electrical connection extending through the baseplate and into the electrostatic puck, the at least one electrical connection surrounded by at least one o-ring.

Additional embodiments of the invention are directed to methods of making a vacuum chamber component. A first piece and a second piece are provided. A reactive foil and at least one o-ring are disposed between the first piece and the second piece. The at least one o-ring defines an outer portion and an inner portion. The reactive foil is ignited to locally heat the foil and form a low temperature solder bond between the first piece and the second piece with the o-ring therebetween providing a hermetic seal between the first piece and the second piece such that when one of the outer portion and inner portion is under vacuum pressure and the other of the outer portion and inner portion is under atmospheric pressure, the hermetic seal prevents a leak between the outer portion and the inner portion.

In detailed embodiments, a solder wetted thin layer is provided on one or both of the first piece and the second piece prior to igniting the reactive foil. The solder wetted thin layer being adjacent to the reactive foil and at least one o-ring.

In some embodiments, the first piece and the second piece are pressed together to cause the at least one o-ring to become compressed to a thickness about 75% of an uncompressed thickness.

In one or more embodiments, the solder bond between the first piece and the second piece is formed without raising the temperature of the first piece or the second piece. In detailed embodiments, igniting the reactive foil occurs at a temperature less than about 50° C. In specific embodiments, the solder bond forms in less than about two seconds. In detailed embodiments, an electrical potential ignites the reactive foil. In specific embodiments, the electrical potential is about 9V DC.

BRIEF DESCRIPTION OF THE DRAWINGS

These features, aspects, and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

FIG. 1 is a partial cross-sectional view of an electrostatic chuck in accordance with one or more embodiments of the invention;

FIG. 4 is an exploded view of an embodiment of an electrostatic chuck and pedestal showing a sealing assembly therebetween and FIG. 5 is a schematic sectional side view of an embodiment of a chamber having a support comprising an electrostatic chuck and pedestal with sealing plates in between.

DETAILED DESCRIPTION

Figure 1:
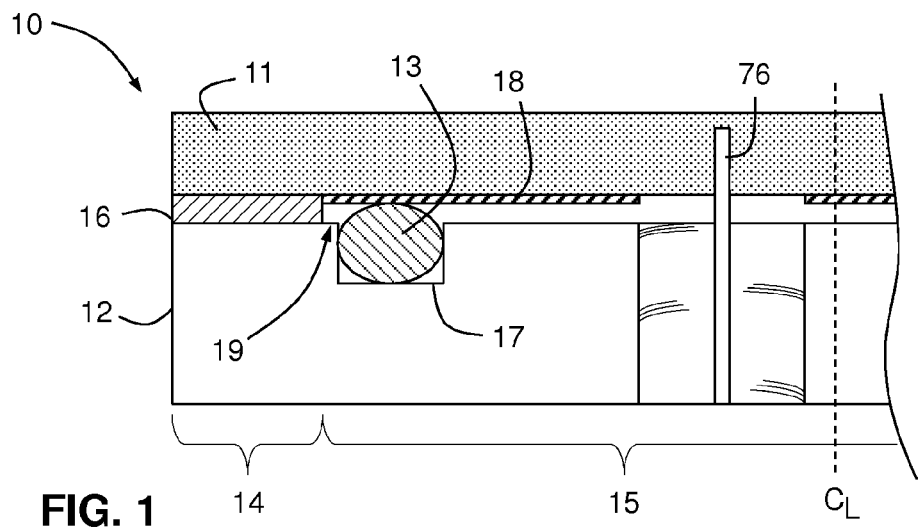

Embodiments of the invention are directed to components for use in a vacuum chamber. FIG. 1 shows a partial cross section of a component 10 in accordance with one or more embodiments of the invention. The component 10 can be any suitable shape. The component 10 comprises a first piece 11, a second piece 12 and at least one o-ring 13 compressed between the first piece 11 and the second piece 12. The at least one o-ring 13 defines an outer radial portion 14 and an inner radial portion 15 of the component 10. A solder bond 16 joins the first piece 11 to the second piece 12 to provide a hermetic seal between the first piece 11 and second piece 12 such that when one of the outer radial portion 14 and inner radial portion 15 is under vacuum pressure and the other of the outer radial portion 14 and inner radial portion 15 is under atmospheric pressure, the hermetic seal prevents a leak between the outer radial portion 14 and the inner radial portion 15. As an illustrative example, the component 10 may be an electrostatic chuck used in a process chamber, and the outer portion may be exposed to vacuum within a process chamber and inner portion may be under atmospheric pressure. However, in some embodiments, the inner portion may be under vacuum pressure and the outer portion may be under atmospheric pressure.

As shown in FIG. 1, there is a gap 19 separating the inner portion of the solder bond 16 and the o-ring 13. As will be discussed in more detail below, during assembly of the first piece 11 and second piece 12, when a reactive foil is used to form the solder bond, it is desirable that this gap be in the range of about 1 mm to 5 mm, for example about 2 mm or 3 mm to prevent heating of the o-ring during the bonding process.

As used in this specification and the appended claims, a "solder bond" describes a bond created by melting a material between two components to be joined. A solder bond is distinguished from a "diffusion bond" is a joint made by formation of bonds at the atomic level between the joined materials.

The first piece 11 and the second piece 12 can be any suitable materials including, but not limited to, ceramic and metal. In detailed embodiments, both the first piece 11 and the second piece 12 are metal. In some embodiments, one of the first piece 11 and the second piece 12 is metal and the other of the first piece 11 and the second piece 12 is ceramic.

The at least one o-ring 13 can be made of any suitable material. In detailed embodiments, the at least one o-ring 13 is made from a compressible material. During assembly of the component 10, the first piece 11 and the second piece 12 are press fitted, or pressed together, causing the o-ring 13 to becomes compressed. In specific embodiments, the at least one o-ring 13 is made from materials selected from at least one of a perfluoropolymer and a soft metal. In some embodiments, the at least one o-ring 13 is positioned within a groove 17 in one or more of the first piece 11 and the second piece 12.

The hardness of suitable materials can be selected based on the desired properties of the o-ring 13. In specific embodiments the hardness is in the range of about 70 duro to about 75 duro. In specific embodiments, the o-ring 13 is compressed to about 75% of its uncompressed thickness. In some embodiments the o-ring 13 is compressed to a thickness in the range of about 50% to about 90% of it uncompressed thickness.

In some detailed embodiments, ceramic and metal surfaces are pre-wet with about 100 microns of solder 18 and a reactive foil 73 is used to provide a heat source. In specific embodiments, a titanium or molybdenum containing alloy with a thickness of less than about 0.5 microns is applied to one or more of the surface to improve solder adhesion strength.

The reactive foil 73 may comprise multiple layers of alternating materials, such as, but not limited to, nickel and aluminum. When energized by electrical or thermal means, these alternating layers react exothermically generating a large, self-sustaining burst of heat. The reaction is very rapid and generally finishes with about 2 seconds and the heat generated is highly localized and causes the layers of the reactive foil 73 to atomically fuse. If solder 18 is placed next to the reactive foil 73, the heat from the reaction will melt the solder 18 joining the adjacent components. In specific embodiments, a thin layer of solder 18, which may be as thin as a few microns of tin could be provided on both sides of the reactive foil 73 to improve the bonding reaction. As noted above with respect to FIG. 1, the inner portion of the bond 16 is spaced from the o-ring by about 1 mm to about 5 mm, for example 2 mm or 3 mm, so that during bonding, heat from the bonding process does not negatively impact the o-ring.

The solder bond 16 forms very rapidly at low temperatures. In specific embodiments, the solder bond 16 is formed without raising the temperature of the first piece 11 or the second piece 12. The properties of the reactive foil 73 can be controlled by tuning the individual layers that form the reactive foil 73. Therefore, the amount of heat generated upon ignition can be controlled so that the solder 18 melts without affecting the temperature of the bulk components being joined.

Figure 2:
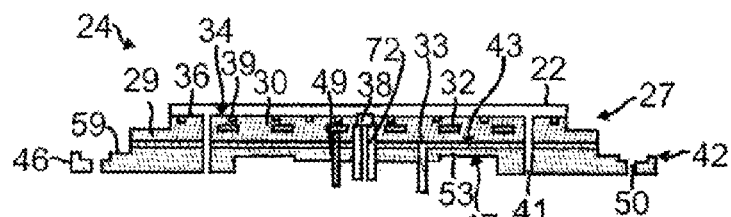
FIG. 2 is a schematic sectional side view of the assembled electrostatic chuck and sealing assembly.

In detailed embodiments, the solder bond 16 is formed between an electrostatic puck 27 (as shown in FIG. 2) and a baseplate 42 without raising the temperature of the electrostatic puck 27 and the metal baseplate 42. This means that the bulk electrostatic puck 27 and bulk baseplate 42 temperatures are not increased. There will be a small region of these materials adjacent the reactive foil 73 which are heated. In detailed embodiments, the reactive foil 73 and at least one solder 18 is placed between the electrostatic puck 27 and the metal baseplate 42. In specific embodiments, a sheet of the solder 18 is placed on both sides of the reactive foil 73.

The reactive foil 73 is ignited by any suitable method, including but not limited to, heat and electricity. When using electricity, or electrical potential, ignition of the reactive foil 73 can be done at low temperature. Low temperature means that the environment around the reactive foil 73 prior to ignition is less than about 70° C. In various embodiments, igniting the reactive foil 73 occurs at a temperature less than about 60° C., 50° C. or 40° C., or at room temperature. In some embodiments, electrical potential is used to ignite the reactive foil 73 to form the solder bond. The electrical potential of specific embodiments is about 9V DC.

The solder bond formed by this technique can be completed in very short time frames, often less than a few seconds. In detailed embodiments, the solder bond is formed in less than about 2 seconds. In one or more embodiments, the solder bond is formed in less than about 5 seconds, 4 seconds, 3 second or 1 second, less than about 500 msec, less than about 250 msec, less than about 100 msec or less than about 50 msec.

Additional embodiments of the invention are directed to methods of making a component 10. A first piece 11 and a second piece 12 are provided. A reactive foil and at least one o-ring 13 are disposed between the first piece 11 and the second piece 12. The reactive foil is ignited to locally heat the foil and form a low temperature solder bond 16 between the first piece 11 and the second piece 12 and a hermetic seal such that when one of the outer portion 14 and inner portion 15 is under vacuum pressure and the other of the outer portion 14 and inner portion 15 is under atmospheric pressure, the hermetic seal prevents a leak between the outer portion 14 and the inner portion 15.

In some embodiments, one or both of the first piece 11 and the second piece 12 are pre-wetted with a thin layer of solder 18 prior to igniting the reactive foil. The thin layer of solder 18 is added prior to igniting the reactive foil and is positioned adjacent the reactive foil and at least one o-ring 13. Ignition of the reactive foil causes the solder 18 to melt and fuse the first piece 11 to the second piece 12. As shown in FIG. 1, the reactive foil was positioned in the outer portion 14 of the component 10 so that upon ignition the solder bond 16 was formed in the outer portion 14 only. An amount of the solder 18 in the inner portion 15 was left unmelted.

Further embodiments of the invention are directed to components 10 comprising at least one o-ring 13 between a first piece 11 and a second piece 12. The first piece 11 and second piece 12 of the component 10 are press fitted to compress the at least one o-ring 13 and interbonded by a solder bond 16 providing a hermetic seal therebetween.

Figure 3:
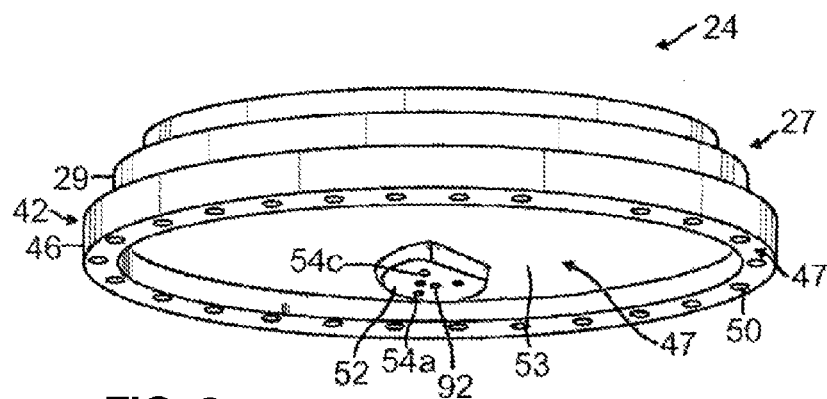
FIG. 3 is a perspective view of the electrostatic chuck of FIG. 2 showing the bottom surface of the chuck.
Figure 4:
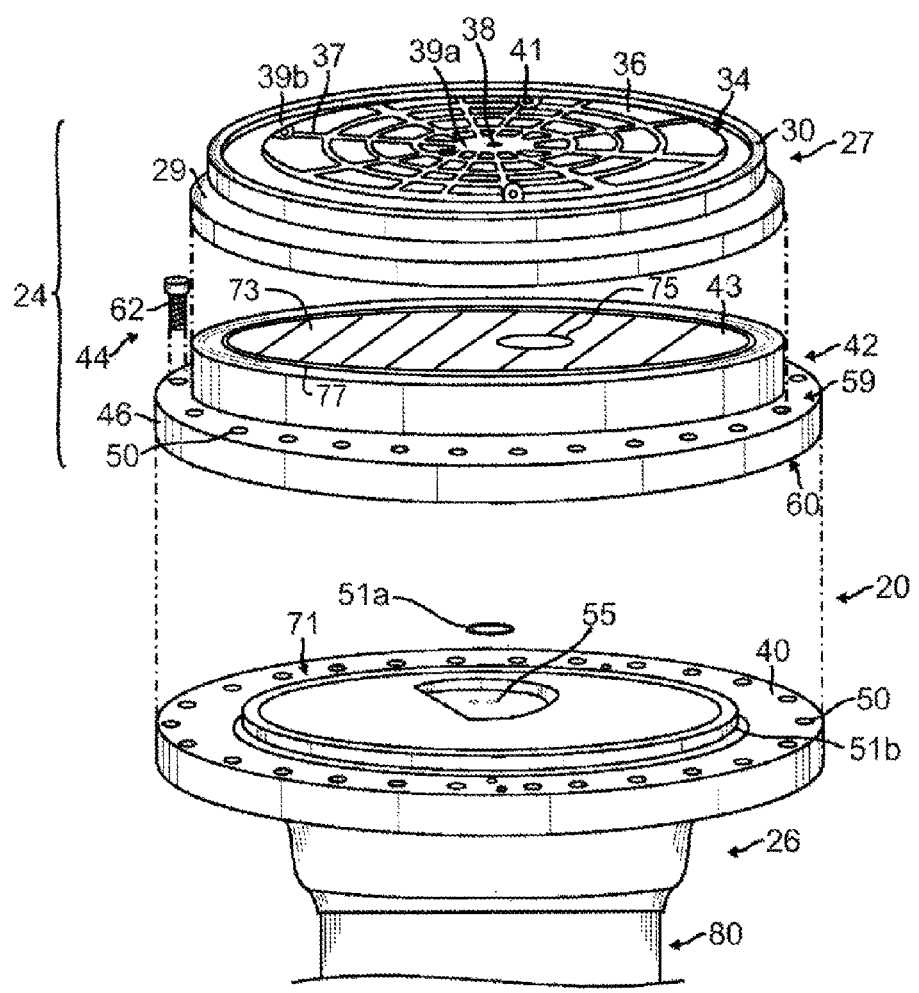

Detailed embodiments of the invention are directed to a substrate support 20 capable of holding a substrate 22 comprises an electrostatic chuck 24 and a pedestal 26, as shown in FIGS. 2 through 4. The electrostatic chuck 24 comprises an electrostatic puck 27 having a disc-like shape that matches the shape and size of the substrate 22 held on the chuck, and with an outwardly extending annular flange 29. The puck 27 comprises a dielectric 30 that at least partially covers a chargeable electrode 32, as shown in FIG. 2, which can be embedded in, or covered by, the dielectric 30. The dielectric 30 desirably comprises a material permeable to electromagnetic energy, such as for example, at least one of aluminum nitride, aluminum oxide, and titanium oxide, and preferably comprises aluminum nitride. The dielectric 30 can, however, also comprise other layers such as polymer layers, for example, polyimide.

Figure 5:
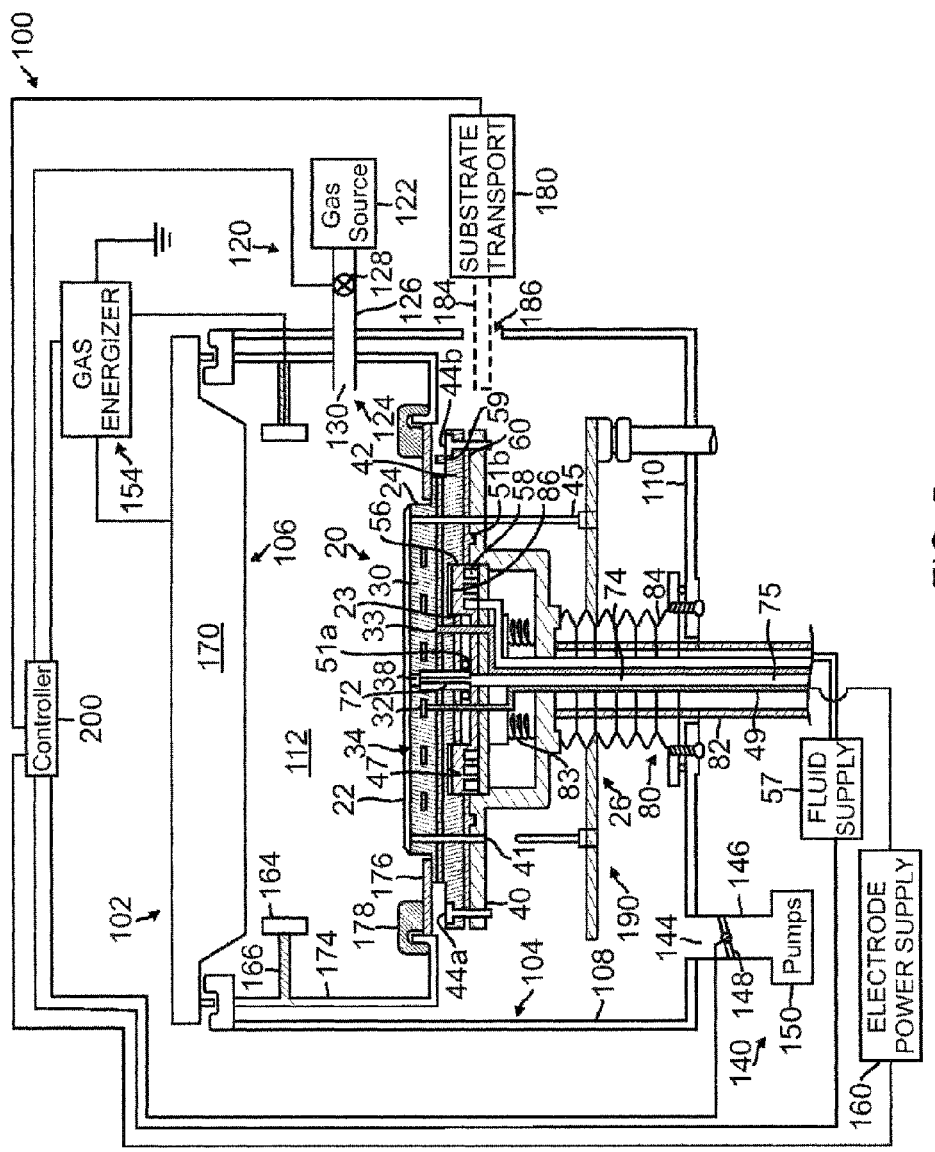

Typically the electrode 32 embedded in the dielectric 30 of the puck 27 comprises a metal layer. The electrode metal can be stainless steel, aluminum, copper or even high temperature metals such as molybdenum or tungsten. In the version shown in FIG. 2, the ceramic body of the electrostatic puck 27 comprises aluminum nitride with an embedded electrode 32 comprising a wire grid or plate of molybdenum. The electrode 32 is capable of being electrically biased to electrostatically hold the substrate 22 on the receiving surface 34 of the chuck. For example, the electrode 32 can be connected via one or more electrical connectors 76, as shown in FIG. 5, to an electrode power supply 160 that delivers a bipolar DC voltage. The bipolar electrode 32 has two sides that are each maintained at a different voltage to generate an electrostatic charge in the substrate 22 which clamps it to the chuck.

The electrostatic puck 27 further comprises a substrate receiving surface 34 that serves to receive a substrate 22 on the electrostatic chuck 24. In the version shown in FIG. 4, the receiving surface 34 comprises a plurality of raised wedge shaped mesas 36 which are formed by intersecting gas grooves 37. The gas grooves 37 are provided to hold a heat transfer gas such as helium or argon, which is supplied through the gas port 38 on the receiving surface 34. In the version shown, the gas grooves 37 are radial lines that are spread apart from one another by from about 5 to about 10°, and terminate in an inner circular groove 39a and an outer circular groove 39b. While an exemplary embodiment of the substrate receiving surface 34 of the electrostatic puck 27 is illustrated herein, it should be understood that other versions can also be used, and the present invention should not be limited to the exemplary version illustrated herein.

The electrostatic chuck 24 further comprises a baseplate 42 joined to the electrostatic puck 27 that is used to attach the electrostatic puck 27 to a pedestal 26 in the chamber. The baseplate 42 comprises a top surface 43 underneath the puck 27, and a peripheral ledge 46 that extends outwardly beyond the top surface 43. The peripheral ledge 46 extends beyond the annular flange 29 of the puck 27 to provide an exposed baseplate portion that is uncovered by the dielectric 30, and that can be attached to an underlying pedestal 26 in a chamber.

In one version, the baseplate 42 comprises a material having thermal properties that are suitably matched to the overlying dielectric 30 of the electrostatic puck 27. In a specific embodiment, the baseplate 42 comprises a composite base of ceramic and metal, which provides better strength and durability than ceramic alone and also has good heat transfer properties. The composite base may have a thermal expansion coefficient that is matched to the dielectric 30 to reduce thermal expansion mismatch. However, it is not necessary to use matched materials as the solder bond happens so quickly that it is possible to bond two materials with very different thermal expansion coefficients. For example, the solder bond is formed at room temperature in less than about one second, so it is possible to bond ceramic (CTE about 5 ppm/° C.) with aluminum (CTE about 23 ppm/° C.).

In some embodiments, the composite base comprises a ceramic having pores that are infiltrated with a metal, which at least partially fills the pores to form a composite material. The ceramic may comprise, for example, at least one of silicon carbide, aluminum nitride, aluminum oxide or cordierite, and is preferably silicon carbide. The ceramic may comprise a pore volume of from about 20 to about 80 volume % of the total volume, the remainder volume being of the infiltrated metal. In another version, the composite baseplate 42 may comprise a different composition of a ceramic and metal, such as metal having dispersed ceramic particles; or the baseplate 42 can be made from only a metal, such as stainless steel or aluminum. The infiltrated metal can comprise aluminum with added silicon and copper. In one version, the baseplate 42 comprises a composite base comprising consisting of ceramic and metal, such as silicon carbide infiltrated with a metal alloy comprising aluminum, silicon and trace amounts of copper. In specific embodiments, the baseplate 42 is made of aluminum.

Some embodiments further comprise at least one electrical connection 76 extending through the baseplate 42 and into the electrostatic puck 27, the at least one electrical connection 76 surrounded by at least one o-ring 13.

The electrostatic chuck 24 is formed by joining the electrostatic puck 27 to the surface 43 of the baseplate 42. In some embodiments, as shown in FIG. 4, the baseplate 42 has a groove 78 in which at least one o-ring 75 is positioned between the electrostatic puck 27 and the baseplate 42. A solder bond can be used to join the electrostatic puck 27 to the baseplate 42. This solder bond helps to form a hermetic seal between the components. In specific embodiments, the solder bond is formed by inserting a reactive foil 73 between the electrostatic puck 27 and the baseplate 42. The reactive foil 73 may have one or more cutouts which provide clearance for the at least one o-ring 75 so that upon sealing the components together, there is a region around and within the o-ring 75 which is not solder bonded.

The electrostatic chuck 24 of specific embodiments is detachable and can be easily removed from the pedestal 26 when replacement or refurbishment of one or more of the electrostatic puck 27 or its underlying baseplate 42 is required.

In some embodiments, the backside surface 47 of the baseplate 42 of the electrostatic chuck 24 comprises a raised central protrusion 52, which is surrounded by an annular trough 53, as for example shown in FIG. 3. The raised central protrusion 52 shown is D-shaped, but other shapes are not prohibited. The raised central protrusion 52 has a contour that is formed by a semicircular perimeter with ends joined by a flat edge. In the version shown, the semicircular contour comprises a three-quarter circle, but it may also be a half-circle or other asymmetric shapes. The protrusion 52 is shaped and sized to match a corresponding cavity 55 in the pedestal 26, as shown in FIG. 4. In this version, the cavity 55 is also D-shaped to mate with the D-shaped protrusion 52 to form an alignment key. This allows the protrusion 52 and cavity 55 to serve as an alignment key when the chuck 24 is positioned on the pedestal 26 in the chamber. The alignment key reduces the possibility of damaging the chuck 24 by improperly positioning or locating the chuck 24 on the underlying pedestal 26 when moving or replacing the chuck 24 from the chamber in the fabrication lab.

In addition, the raised central portion also has three apertures 54a-c, which are spaced apart from one another. The apertures 54 receive the electrode terminal posts 49 which are mounted in the cavity 55 of the pedestal 26. The apertures 54a-c also served as a secondary alignment guide further ensuring the placement accuracy of positioning the chuck 24 onto the pedestal 26. The asymmetrically offset apertures 54a-c ensures that the chuck 24 can only be positioned in one orientation over the pedestal 26. In one version, the offset angle is from about 115 to about 135°, for example about 125°. Two of the apertures 54a,b are used to connect to electrode posts 49 that supply a voltage bias to the bipolar electrodes 32 to maintain an electrostatic charge in the electrodes. The third aperture 54c connects to another post (not shown) which contacts the chuck 24 to a floating potential that is used to adjust voltage applied through the post 49.

In addition, the protrusion 52 has a centrally positioned gas coupler 74 to receive a gas tube 72 that extends out of the cavity 55. The gas tube 72 provides a heat transfer gas, such as argon or helium, to the gas port 38, which in turn supplies the gas grooves 37, 39a, b to maintain a supply of heat transfer gas below the substrate 22 during processing. The heat transfer gas assists in exchanging heat between the overlying substrate 22 and chuck 24 as shown in FIG. 5. Yet another hole 92 is provided to allow insertion of a thermocouple 33, typically a k-type thermocouple 33, to contact the puck 27.

The chuck 24 is fastened to the ledge 46 of the support pedestal 26 and a tight seal is formed between the electrostatic chuck 24 and the pedestal 26 by tightening connectors 44a, b inserted in holes 50 along the edge of the peripheral ledge 46 of the baseplate.

Because the exposed peripheral ledge 46 of the baseplate 42 is not covered by the dielectric 30, the relatively strong ledge can be detachably connected to the pedestal flange 40 to allow for easy removal of the electrostatic chuck 24 comprising the puck 27 and baseplate 42 from the pedestal 26 in a chamber. This connection can be achieved by inserting connectors 44 through the composite material of the ledge 46 and into the flange 40 of the pedestal 26. The detachable electrostatic chuck 24 can be removed from the pedestal 26 by removing the connectors 44 when the puck 27 or baseplate 42 becomes excessively eroded or dirty with process residues. The "detachable" electrostatic chuck 24 reduces the costs associated with processing substrates with the electrostatic chuck 24 by allowing the electrostatic puck 27 and/or baseplate 42 to be replaced or refurbished as needed, without requiring replacement of the entire electrostatic chuck 24.

To connect the baseplate 42 to the pedestal 26, the peripheral ledge 46 comprises a plurality of holes 50 that are sized and shaped to allow connectors 44 to pass therethrough to connect to the pedestal flange 40 (FIG. 4). For example, the holes 50 may extend vertically through a thickness of the peripheral ledge 46, from an upper surface 59 to a lower surface 60. The holes 50 can also extend through at least a portion of the pedestal flange 40 to secure the ledge 46 to the flange 40. A connector 44 suitable to connect the baseplate ledge 46 to the pedestal flange 40 via the holes 50 can comprise, for example, at least one of a pin, bracket, bolt or screw. For example, the connector 44 may comprise a threaded pin having a head 62 that is held on the top surface 59 of the peripheral ledge 46, and a threaded lower end 63 that fits into the threaded hole 50 to secure the baseplate 42 to the pedestal 26. The baseplate 42 desirably comprises a material that is sufficiently strong to allow it to be easily machined to shape and which can be secured to the pedestal 26 via the holes 50 substantially without cracking or breaking.

A substrate processing apparatus 100 comprises a chamber 102 with a substrate support 20 comprising an electrostatic chuck 24 detachably mounted on a pedestal 26, as shown in FIG. 5. The pedestal 26 comprises a housing 80 adapted to protect portions of the electrostatic chuck 24 from the process environment. The housing 80 protects components within the enclosure, such as for example electrical connectors, gas tubes and fluid conduits. The pedestal 26 further comprises a pedestal flange 40 that extends outwardly from the top of the housing 80 to provide a projecting support for the electrostatic chuck 24. The pedestal housing 80 can comprise a metal that is resistant to corrosion in the substrate processing environment, such as for example, stainless steel or titanium. The pedestal 26 can also comprise a pedestal column that extends between the housing 80 and the chamber 102. In the version shown, the pedestal column comprises a bellows 84 and a motorized moveable post 82. The pedestal housing 80 is mounted to the moveable post 82 and a motor (not shown) is used to raise and lower the moveable post 82 and thereby the substrate support 20 within the process chamber 102. In one version, the bellows 84 comprises an edge-welded stainless steel bellows. The upper edge of the bellows 84 is welded to the pedestal housing 80 and the lower edge of the bellows 84 is fastened to the bottom wall 110 of the chamber. An O-ring is mounted at the interface between the bottom wall 110 and the bellows 84. Electrical connectors, gas conduits and fluid conduits can be passed through the bellows 84 to protect them from the processing environment.

The electrostatic chuck 24 can further comprise other elements that improve substrate processing, such as for example, a thermocouple 33 having a temperature sensing end embedded in the electrostatic puck 27, as shown in FIG. 2. The thermocouple 33 can connect to a temperature monitor, such as a chamber controller 200, to monitor the temperature of the electrostatic chuck 24 and substrate 22 during processing. The electrostatic chuck 24 can also comprise a heat transfer gas port 38 on the receiving surface 34 of the electrostatic puck 27 to deliver a heat transfer gas, such as argon, to the backside of a substrate 22. The heat transfer gas port 38 can feed channels formed on the support receiving surface 34, and can be connected via a gas tube 72 to a heat transfer gas supply (not shown). A gas coupler 74 can be inserted into electrostatic puck 27 to define a path for the heat transfer gas through the puck 27, and to provide a desired flow of the heat transfer gas to the support receiving surface 34.

In one version, the pedestal 26 further comprises a heat transfer plate 56 which contacts the backside surface 47 of the chuck 24 to transfer heat to or from the chuck 24 and overlying substrate 22 to maintain a desired substrate temperature. For example, the heat transfer plate 56 may comprise a heating or cooling plate. In one version, the heat transfer plate 56 can comprise at least one fluid channel 58 through which a heat transfer fluid can be flowed to control the temperature of the heat transfer plate 56. The heat transfer fluid is supplied by a fluid supply 57 connected to the fluid channel 58 via one or more conduits 61 routed through the column 51 of the pedestal 26. The heat transfer plate 56 desirably extends beneath a substantial portion of the substrate receiving surface 34, such as for example from at least about 25% to about 85% of the substrate receiving surface 34, to provide good heat exchange with the substrate 22. The heat transfer plate 56 is made of a thermally conductive material such as a metal, for example at least one of copper, stainless steel or aluminum. A thermal conductor 86 can be provided between the baseplate 42 and the heat transfer plate 56 to enhance heat exchange therebetween. The thermal conductor 86 conforms to the top surface 65 of the heat transfer plate 56 and the bottom surface 47 of the baseplate 42. In one version, the thermal conductor 86 comprises an interstitial material layer such as graphite. In one version, the heat transfer plate 56 is mounted to the pedestal 26 via a spring 83, which presses the heat transfer plate 56 to the bottom surface 47 of the baseplate 42, thereby ensuring thermal contact.

An embodiment of an apparatus 100 comprising a substrate-processing chamber 102 suitable for processing a substrate 22 is shown in FIG. 5. The particular embodiment of the apparatus 100 shown herein is suitable for processing a substrate 22, such as semiconductor wafers, and may be adapted by those of ordinary skill to process other substrates 22, such as flat panel displays, polymer panels, or other electrical circuit receiving structures. The apparatus 100 is particularly useful for processing layers, such as etch resistant, silicon-containing, metal-containing, dielectric, and/or conductor layers on the substrate 22. The apparatus 100 may also be attached to a platform (not shown) that contains and provides electrical, plumbing, and other support functions for the apparatus 100 and may be part of a multi-chamber system (also not shown).

Generally, the process chamber 102 comprises enclosure walls 104, which may comprise a ceiling 106, sidewalls 108, and a bottom wall 110 that enclose a process zone 112. In operation, process gas is introduced into the chamber 102 through a gas supply 120 that includes a process gas source 122, and a gas distributor 124. The gas distributor 124 may comprise one or more conduits 126 having one or more gas flow valves 128 and one or more gas outlets 130 around a periphery of the substrate 22, which is held in the process zone 112 on the electrostatic chuck 24. Alternatively, the gas distributor 124 may comprise a showerhead gas distributor (not shown). Spent process gas and process byproducts are exhausted from the chamber 102 through an exhaust 140 which may include an exhaust port 144 that receives spent process gas from the process zone 112 and delivers the gas to an exhaust conduit 146, a throttle valve 148 to control the pressure of process gas in the chamber 102, and one or more exhaust pumps 150.

The process gas may be energized to process the substrate 22 by a gas energizer 154 that couples energy to the process gas in the process zone 112 of the chamber 102. For example, the gas energizer 154 may comprise process electrodes that may be electrically biased to energize the process gas. The process electrodes may include an electrode that is a wall 104, such as a sidewall 108 of the chamber 102, and which may be capacitively coupled to another electrode, such as the ceiling 106 or target 170 in the chamber 102. The target 170 is electrically biased relative to the wall 104 to energize a process gas in the chamber 102 to sputter material off from the target 170 onto the substrate 22. The electrodes are biased by a DC voltage, a high frequency voltage, such as a radio frequency (RF) voltage, or a combination of both.

Alternatively or additionally, the gas energizer 154 can also include an antenna comprising an inductor coil 164 which has a circular symmetry about the center of the chamber 102. The inductor coil 164 is supported by standoffs 166 that separate the coil from the chamber sidewall 108. In yet another version, the gas energizer 154 may comprise a microwave source and waveguide to activate the process gas by microwave energy in a remote zone (not shown) upstream from the chamber 102. Additional inductor or electromagnetic coils (not shown) can also be located around the chamber 102, for example, above the ceiling of the chamber or around the sidewalls 108.

In one version, the chamber 102 comprises a physical vapor deposition chamber capable of sputter depositing material on a substrate 22. In this version, the chamber comprises a ceiling 106 which has a sputtering target 170 having material to be deposited on the substrate. The target 170 can be electrically biased with respect to another component in the chamber, such as a process shield, by the gas energizer 154 that energizes the process gas and sputters material from the target 170 and onto the substrate 22. When a target 170 is used, the chamber also comprises an L-shaped shield 174 surrounding the periphery of the substrate 22 to capture process deposits. In addition a deposition ring 176 and cover ring 178 can also be used to protect the edge of the chuck 24 and the pedestal flange 40.

To process a substrate 22, the process chamber 102 is evacuated and maintained at a predetermined sub-atmospheric pressure. A substrate 22 is then provided on the electrostatic chuck 24 of the substrate support 20 by a substrate transport 180 which operates a robot arm 184 that is passed through a slit 186 in the chamber sidewall 108, bearing a substrate 22. A lift pin system 190 comprising lift pins 45, are raised through the holes 41 in the substrate support 20 to receive the substrate 22. The lift pins lower through the same holes 41 to rest the substrate 22 on the substrate support receiving surface 34. The gas distributor 124 provides a process gas to the chamber 102 and the gas energizer 154 couples energy to the process gas to energize the gas and process the substrate 22, for example, by etching material on the substrate or depositing material on the substrate 22 by PVD or CVD. If required, to clean the chamber after processing of the substrate 22, the gas distributor 124 provides a process gas comprising a cleaning gas to the chamber 102 and the gas energizer 154 energizes the cleaning gas.

The chamber 102 is controlled by a controller 200 that comprises program code having instruction sets to operate components of the chamber 102 to process substrates 22 in the chamber 102. For example, the controller 200 can comprise a substrate positioning instruction set to operate one or more of the electrostatic chuck 24, lift pins 45, and substrate transport 180 to position a substrate 22 in the chamber 102 and to set a chucking voltage applied by the electrode power supply 160 to hold the substrate 22 on the electrostatic chuck 24; a gas flow control instruction set to operate the flow control valves 134 to set a flow of gas to the chamber 102; a gas pressure control instruction set to operate the exhaust throttle valve 148 to maintain a pressure in the chamber 102; a gas energizer control instruction set to operate the gas energizer 154 to set a gas energizing power level; a temperature control instruction set to control temperatures in the chamber 102, for example by controlling the supply of heat transfer fluid supplied to the heat transfer plate 56, and the supply of heat transfer gas to the support receiving surface 34; and a process monitoring instruction set to monitor the process in the chamber 102, for example by monitoring temperatures via the thermocouple 33.

Although exemplary embodiments of the present invention are shown and described, those of ordinary skill in the art may devise other embodiments which incorporate the present invention, and which are also within the scope of the present invention. For example, the electrostatic chuck 24 can be of other types, for example, a polymer dielectric layer covering a metal plate that serves as an electrode. Moreover, the chuck 24 can be attached to the pedestal by other means than the peripheral ledge 46 and pedestal flange 40, for example, a screwing thread on the backside of the chuck. Furthermore, relative or positional terms shown with respect to the exemplary embodiments are interchangeable. Therefore, the appended claims should not be limited to the descriptions of the preferred versions, materials, or spatial arrangements described herein to illustrate the invention.

What is claimed is:

1. A component for use a in a vacuum process chamber comprising:
    a first piece comprising a first material having a first coefficient of thermal expansion, the first piece having a receiving surface to receive a substrate, the receiving surface comprising a plurality of raised mesas formed by intersecting radial grooves that terminate in an inner circular groove;
    a second piece comprising a second material having a second coefficient of thermal expansion different from the first coefficient of thermal expansion, the second piece including a peripheral ledge having a plurality of holes therethrough;
    at least one o-ring compressed between the first piece and the second piece, the at least one o-ring defining an outer radial portion and an inner radial portion of the component; and
    a solder bond joining the first piece to the second piece to provide a hermetic seal between the first piece and second piece such that when one of the outer radial portion and inner radial portion is under vacuum pressure and the other of the outer radial portion and inner radial portion is under atmospheric pressure, the hermetic seal prevents a leak between the outer radial portion and the inner radial portion, and wherein the o-ring is spaced about 1 mm to about 5 mm from an inner portion of the solder bond.

2. The component of claim 1, wherein both the first piece and the second piece are metal.

3. The component of claim 1, wherein one of the first piece and the second piece is metal and the other of the first piece and the second piece is ceramic.

4. The component of claim 1, wherein the at least one o-ring is positioned within a groove in one or more of the first piece and the second piece.

5. The component of claim 1, wherein the first piece is an electrostatic puck comprising a ceramic body and the second piece is a baseplate comprising a metal body.

6. The component of claim 1, wherein the at least one o-ring is compressible.

7. The component of claim 6, wherein the at least one o-ring is made of a perfluoropolymer.

8. The component of claim 6, wherein the at least one o-ring is made from a soft metal.

9. The component of claim 6, wherein the at least one o-ring in a compressed state has a thickness about 75% of the thickness when in an uncompressed thickness.

10. The component of claim 5, further comprising at least one electrical connection extending through the baseplate and into the electrostatic puck, the at least one electrical connection surrounded by at least one o-ring.

11. The component according to claim 1, wherein the solder bond is formed using electrically ignited foil material.

12. A method of making a vacuum chamber component comprising:
    providing a first piece and a second piece, the first piece comprising a first material having a first coefficient of thermal expansion and a receiving surface to receive a substrate, the receiving surface comprising a plurality of raised mesas formed by intersecting radial grooves that terminate in an inner circular groove, the second piece comprising a second material having a second coefficient of thermal expansion different from the first coefficient of thermal expansion, the second piece including a peripheral ledge having a plurality of holes therethrough;
    disposing a reactive foil and at least one o-ring between the first piece and the second piece, the at least one o-ring defining an outer portion and an inner portion; and
    igniting the reactive foil to locally heat the reactive foil and form a low temperature solder bond between the first piece and the second piece with the o-ring therebetween providing a hermetic seal between the first piece and the second piece such that when one of the outer portion and inner portion is under vacuum pressure and the other of the outer portion and inner portion is under atmospheric pressure, the hermetic seal prevents a leak between the outer portion and the inner portion the o-ring spaced about 1 mm to about 5mm from the inner portion of the solder bond.

13. The method of claim 12, further comprising providing a solder wetted thin layer on one or both of the first piece and the second piece prior to igniting the reactive foil, the solder wetted thin layer adjacent the reactive foil and at least one o-ring.

14. The method of claim 12, further comprising pressing the first piece and the second piece together to cause the at least one o-ring to become compressed to a thickness about 75% of an uncompressed thickness.

15. The method of claim 12, wherein the solder bond between the first piece and the second piece is formed without raising the temperature of the first piece or the second piece.

16. The method of claim 12, wherein igniting the reactive foil occurs at a temperature less than about 50 ° C.

17. The method of claim 12, wherein the solder bond forms in less than about two seconds.

18. The method of claim 12, wherein an electrical potential ignites the reactive foil.

19. The method of claim 18, wherein the electrical potential is about 9V DC.

20. A component comprising at least one o-ring between a first piece and a second piece, the component press fitted to compress the at least one o-ring and interbonded by a solder bond providing a hermetic seal therebetween, and at least one electrical connection extending through the second piece and into the first piece, the at least one electrical connection surrounded by the at least one o-ring, wherein the o-ring is spaced about 1 mm to about 5 mm from an inner portion of the solder bond, and wherein the first piece comprises a first material having a first coefficient of thermal expansion, the first piece having a receiving surface comprising a plurality of raised mesas formed by intersecting radial grooves, and the second piece comprising a second material having a second coefficient of thermal expansion different from the first coefficient of thermal expansion, the second piece including a peripheral ledge with a plurality of holes therethrough.

21. The component of claim 20, wherein the at least one o-ring defines an outer portion and an inner portion of the component and the solder bond providing a hermetic seal between the first piece and second piece such that when one of the outer portion and inner portion is under vacuum pressure and the other of the outer portion and inner portion is under atmospheric pressure, the hermetic seal prevents a leak between the outer portion and the inner portion.

22. The component of claim 20, wherein the solder bond is formed by igniting a reactive foil between the first piece and the second piece.

* * * * *